US008313414B2

(12) United States Patent
Kuwahara et al.

(10) Patent No.: US 8,313,414 B2
(45) Date of Patent: Nov. 20, 2012

(54) SHIFT CONTROL DEVICE AND SHIFT CONTROL METHOD FOR AUTOMATIC TRANSMISSION

(75) Inventors: Seiji Kuwahara, Toyota (JP); Hideaki Otsubo, Nishikamo-gun (JP); Masato Kaigawa, Toyota (JP); Masayuki Baba, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 330 days.

(21) Appl. No.: 12/451,764

(22) PCT Filed: Oct. 21, 2008

(86) PCT No.: PCT/IB2008/002801
§ 371 (c)(1),
(2), (4) Date: Nov. 30, 2009

(87) PCT Pub. No.: WO2009/053809
PCT Pub. Date: Apr. 30, 2009

(65) Prior Publication Data
US 2010/0137103 A1 Jun. 3, 2010

(30) Foreign Application Priority Data
Oct. 22, 2007 (JP) .................................. 2007-273797

(51) Int. Cl.
*F16H 59/74* (2006.01)
(52) U.S. Cl. ......................................... 477/101; 477/115
(58) Field of Classification Search .................... 477/43, 477/101, 115, 120, 121; 701/51, 54–56; 180/338
See application file for complete search history.

(56) References Cited

U.S. PATENT DOCUMENTS

| 4,933,859 | A  | * | 6/1990  | Tsuyama et al. ................ 701/93 |
| 5,241,476 | A  |   | 8/1993  | Benford et al. |
| 2002/0013650 | A1 |   | 1/2002  | Kusafuka et al. |
| 2002/0058568 | A1 |   | 5/2002  | Ishiguro et al. |
| 2002/0198078 | A1 |   | 12/2002 | Mori |
| 2004/0097328 | A1 |   | 5/2004  | Makiyama et al. |
| 2007/0099756 | A1 |   | 5/2007  | Saito et al. |

FOREIGN PATENT DOCUMENTS

| DE | 10 2006 050 325 A1 | 5/2007 |
| EP | 1 420 194 A2 | 5/2004 |

(Continued)

OTHER PUBLICATIONS

German Office Action received Nov. 19, 2010 issued in German Patent Application No. 11 2008 003 135.5 (with translation).

(Continued)

*Primary Examiner* — Justin Holmes
(74) *Attorney, Agent, or Firm* — Oliff & Berridge, PLC

(57) ABSTRACT

An electronic control unit is provided with two types of gear change maps: a first gear change map based on the vehicle speed and the accelerator pedal operation amount; and a second gear change map based on the vehicle speed and the required drive force of the vehicle. The electronic control unit determines whether the automatic transmission should downshift with reference to the first gear change map, and determines whether the automatic transmission should upshift with reference to the second gear change map.

9 Claims, 4 Drawing Sheets

FOREIGN PATENT DOCUMENTS

| | | |
|---|---|---|
| JP | U 61-64548 | 5/1986 |
| JP | A 03-117769 | 5/1991 |
| JP | A 04-092159 | 3/1992 |
| JP | A 04-194448 | 7/1994 |
| JP | A 10-181385 | 7/1998 |
| JP | A 10-184890 | 7/1998 |
| JP | A 11-198684 | 7/1999 |
| JP | A 2001-193829 | 7/2001 |
| JP | A 2007-231963 | 9/2007 |
| JP | A 2008-014347 | 1/2008 |

OTHER PUBLICATIONS

International Search Report mailed Mar. 13, 2009 for National Phase Application No. PCT/IB2008/002801 filed Oct. 21, 2008.

Written Opinion of the International Searching Authority mailed Mar. 13, 2009 for National Phase Application No. PCT/IB2008/002801 filed Oct. 21, 2008.

Japanese Office Action with English-language translation issued Aug. 25, 2009 for Japanese Patent Application No. 2007-273797.

* cited by examiner

EXAMPLE OF SHIFT MAP

SHIFT CONTROL DEVICE AND SHIFT CONTROL METHOD FOR AUTOMATIC TRANSMISSION

BACKGROUND OF THE INVENTION

1. Field of the Invention

The present invention relates to a shift control device and a shift control method for an automatic transmission.

2. Description of the Related Art

As well known, a shift control device for an automatic transmission determines an upshift and a downshift of gears according to a gear shift map (gear shift schedule) based on the vehicle speed and the accelerator pedal operation amount (or the throttle opening degree) as described in, for example, Japanese Utility Model Application Publication No. 61-64548 (JP-U-61-64548). FIG. 5 shows an example of a gear shift map based on the vehicle speed and the accelerator pedal operation amount. According to the gear shift determination based on the vehicle speed and the accelerator pedal operation amount (or the throttle opening degree), the gears are shifted based on accelerator pedal operations according to the driver's intention.

In the case where priority is given to satisfying requirement relating to the engine, for example requirements relating to fuel consumption characteristics, exhaust characteristics, and combustion modes, the gear shift determination may be based on the load on the internal combustion engine or the drive force of the vehicle. That is, the fuel consumption characteristics and the exhaust characteristics of the internal combustion engine may be improved by shifting the automatic transmission such that the internal combustion engine operates at an optimal rotational speed and under a desirable load in terms of fuel consumption, emission, and so forth. However, gear shift determination based only on the load of the internal combustion engine and the drive force does not allow the gear shift operation of the automatic transmission to reflect the driver's intention based on accelerator pedal operations.

SUMMARY OF THE INVENTION

The present invention provides a shift control device and a shift control method for an automatic transmission that can both reflect the driver's intention and satisfy the requirements of an internal combustion engine, for example requirements relating to fuel consumption characteristics and exhaust characteristics.

A first aspect of the present invention is directed to a shift control device that determines whether an automatic transmission should change gear. The shift control device includes: a first gear change determination section that determines whether the automatic transmission should change gear based on a vehicle speed and an accelerator pedal operation amount or a throttle opening degree; and a second gear change determination section that determines whether the automatic transmission should change gear based on the vehicle speed and a load on an internal combustion engine or a required drive force of the vehicle. The first gear change determination section is used to determine whether the automatic transmission should downshift, and the second gear change determination section is used to determine whether the automatic transmission should upshift.

In the above configuration, a determination that the automatic transmission should downshift is made based on the vehicle speed and the accelerator pedal operation amount or the throttle opening degree. Accordingly, the transmission is downshifted based on the accelerator pedal operation. On the other hand, a determination that the automatic transmission should upshift is made based on the vehicle speed and the load on the internal combustion engine or the required drive force of the vehicle. Therefore, the transmission is upshifted based on the load on the internal combustion engine or the required drive force of the vehicle so as to satisfy requirements relating to the fuel consumption characteristics, the exhaust characteristics, and so forth of the internal combustion engine. The required drive force of the vehicle means the drive force required for the vehicle to maintain its current traveling state, and is calculated based on, for example, the vehicle speed and the accelerator pedal operation amount.

In general, if the automatic transmission is not downshifted when the accelerator pedal is depressed, acceleration as intended by the driver cannot be obtained. Therefore, the automatic transmission should be downshifted in accordance with accelerator pedal operations and with the driver's intention reflected to some degree. On the other hand, the automatic transmission is seldom upshifted intentionally by the driver.

In this respect, in the above configuration, the automatic transmission is downshifted based on accelerator pedal operations to reflect the driver's intention, and upshifted based on the load on the internal combustion engine or the required drive force of the vehicle so as to satisfy requirements relating to fuel consumption characteristics, exhaust characteristics, and so forth. Thus, according to the above configuration, it is possible to both reflect the driver's intention and satisfy the requirements relating to the internal combustion engine; for example requirements relating to fuel consumption characteristics and exhaust characteristics.

In the above shift control device, the first gear change determination section may make auxiliary determination for upshifting the automatic transmission, and the second gear change determination section may make auxiliary determination for downshifting the automatic transmission.

If the automatic transmission is upshifted and downshifted based on different parameters as discussed above, gear hunting may occur in the gear change operation of the automatic transmission. That is, the condition for a downshift, which is based on accelerator pedal operations, and the condition for an upshift, which is based on the load on the internal combustion engine or the required drive force of the vehicle, may be simultaneously met on some occasions, so that a downshift is immediately followed by an upshift, or vice versa. When downshifting, gear hunting in the gear change operation may be avoided by taking the load on the internal combustion engine or the required drive force of the vehicle into some account, in addition to the accelerator pedal operation. When upshifting, gear hunting in the gear change operation may be avoided by taking accelerator pedal operations into some account, in addition to the load on the internal combustion engine or the required driving force of the vehicle.

In this respect, in the above configuration, the first gear change determination section, which is used to determine whether the automatic transmission should downshift, may also be used to make an auxiliary determination whether the automatic transmission should upshift to avoid gear hunting, as described above. In addition, the second gear change determination section, which is used to determine whether the automatic transmission should upshift, may also be used to make an auxiliary determination whether the automatic transmission should upshift to avoid gear hunting. Thus, according to the above configuration, it is possible to avoid gear hunting when changing gear.

In the above configuration, if a preceding shift is a downshift, the first gear change determination section may be used to determine whether a subsequent downshift is permitted, and if the preceding shift is an upshift, the first and second gear change determination sections may be both used to determine whether a subsequent downshift is permitted.

In the above configuration, if the preceding and subsequent shifts are consecutive downshifts, the vehicle speed and the accelerator pedal operation amount or the throttle opening degree are used to determine whether the subsequent downshift is permitted. On the other hand, if the preceding shift is an upshift, both the first gear change determination section and the second gear change determination section are used to determine whether a subsequent downshift is permitted. The automatic transmission will downshift if both the first and second gear change determination sections permit the subsequent downshift. The downshift is permitted if the condition for a downshift based on the vehicle speed and the accelerator pedal operation amount or the throttle opening degree, and the condition for a downshift based on the vehicle speed and the load on the internal combustion engine or the drive force, are both fulfilled. Therefore, if an upshift is followed by a downshift, the determination to downshift the automatic transmission is based not only on the vehicle speed and the accelerator pedal operation amount or the throttle opening degree, but also on the load on the internal combustion engine or the required drive force of the vehicle, thereby avoiding gear hunting when changing gear as discussed above.

In the above configuration, if the preceding shift is an upshift, the second gear change determination section may be used to determine whether a subsequent upshift is permitted, and if the preceding shift is a downshift, the first and second gear change determination sections may be both used to determine whether a subsequent upshift is permitted.

In the above configuration, if the preceding and subsequent shifts are consecutive upshifts, the vehicle speed and the load on the internal combustion engine or the required drive force of the vehicle are used to determine whether the subsequent upshift is permitted. On the other hand, if the preceding shift is a downshift, both the first gear change determination section and the second gear change determination section are used to determine whether a subsequent upshift is permitted. In the above configuration, if the preceding shift is a downshift, the automatic transmission will upshift if both the first and second gear change determination sections permit the subsequent upshift. The subsequent upshift is permitted if the condition for an upshift based on the vehicle speed and the accelerator pedal operation amount or the throttle opening degree, and the condition for an upshift based on the vehicle speed and the load on the internal combustion engine or the drive force, are both fulfilled. Therefore, if a downshift is followed by an upshift, the determination to upshift the automatic transmission is based not only on the vehicle speed, and the load on the internal combustion engine or the required drive force of the vehicle, but also on the accelerator pedal operation amount or the throttle opening degree, thereby avoiding gear hunting in the gear change operation as discussed above.

In the above configuration, a first determination whether the automatic transmission should change gear in a current trip may be made on an assumption that the preceding shift is an upshift.

In general, the first shift in each trip is an upshift from first gear to second gear. For this upshift, there is no need to consider gear hunting when changing gear. This is why a first determination whether the automatic transmission should change gear in the current trip may be made on the assumption that the preceding shift is an upshift. The term "trip" as used herein refers to the period from when the ignition is turned on until when it is turned off.

A second aspect of the present invention is directed to a gear change control method for an determining whether the automatic transmission should change gear. The gear change control method includes: determining whether the automatic transmission should downshift based on a vehicle speed, and an accelerator pedal operation amount or a throttle opening degree; and determining whether the automatic transmission should upshift based on the vehicle speed, and a load on an internal combustion engine or a required drive force of the vehicle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
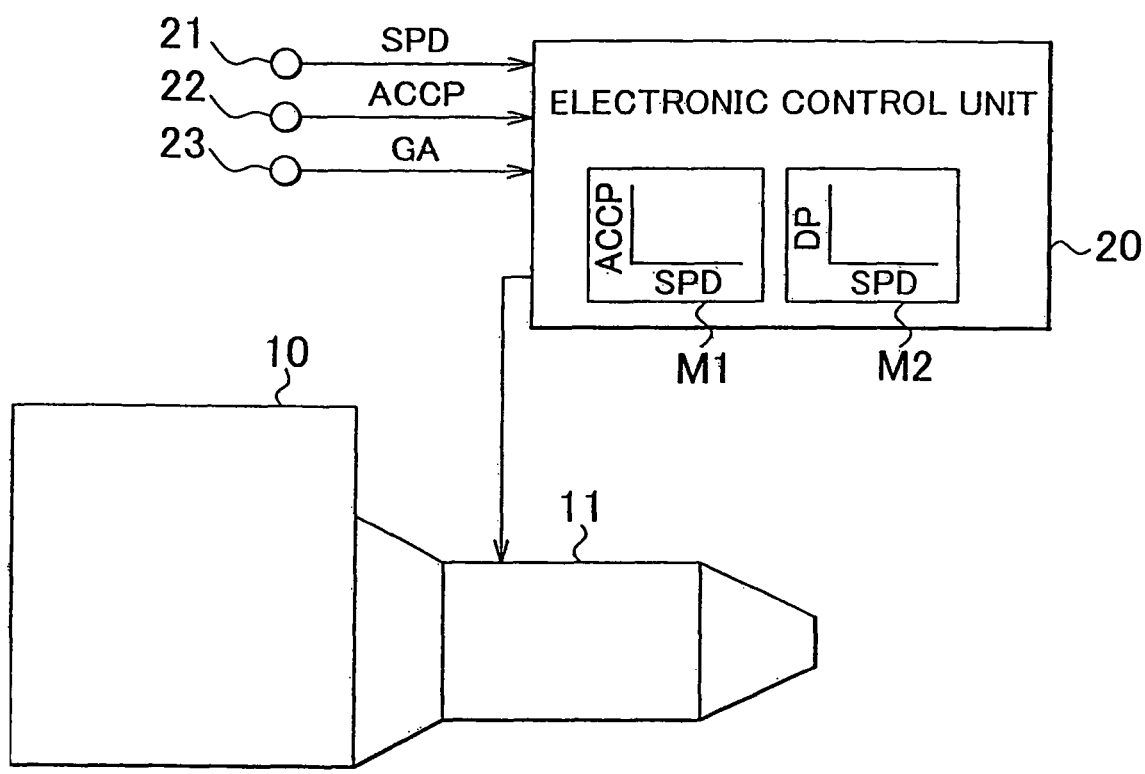
FIG. 1 is a schematic diagram showing the overall configuration of a gear change control device in accordance with an embodiment of the present invention.

Below, a shift control device for an automatic transmission in accordance with an embodiment of the present invention will be described with reference to FIGS. 1 to 4. FIG. 1 shows the overall configuration of a shift control device for an automatic transmission in accordance with the embodiment of the present invention. As shown in the drawing, an automatic transmission 11 is connected to an internal combustion engine 10 via a torque converter. The automatic transmission 11 includes a planetary gear mechanism and a plurality of friction engagement mechanisms (clutch, brake), and is configured to engage any of a plurality of speeds by selectively engaging and disengaging the friction engagement mechanisms through hydraulic control using a hydraulic circuit. The automatic transmission 11 is provided with five forward gears.

An electronic control unit 20 executes a gear change control, that is, it changes the gear of the automatic transmission 11. The electronic control unit 20 is composed of a central processing unit (CPU) that processes various operations for the gear change control, a read only memory (ROM) that stores a program and data for control, a random access memory (RAM) that temporarily stores the operation results of the CPU, and an input/output port (I/O) that receives and outputs signals from and to the outside.

Various sensors that detect the traveling state of the vehicle and the operating state of the internal combustion engine 10 are connected to the input port of the electronic control unit 20. Examples of these sensors include a vehicle speed sensor 21 that detects the vehicle speed SPD, an accelerator sensor 22 that detects the depression amount of an accelerator pedal (accelerator pedal operation amount ACCP), and an air flow meter 23 that detects the intake air amount GA of the internal combustion engine 10. The electronic control unit 20 determines whether to change gear based on the traveling state of the vehicle and the operating state of the internal combustion engine 10, which may be determined from the detection results of these sensors. The electronic control unit 20 then outputs a command signal from the output port to the automatic transmission 11 according to the determination results to change the gear of the automatic transmission 11.

The determination whether to change the gear in the gear change control is made according to a gear change map stored in the ROM of the electronic control unit 20. Two gear-shift maps, namely a first gear change map M1 and a second gear change map M2, are provided in the gear change control device of this embodiment.

Figure 2:
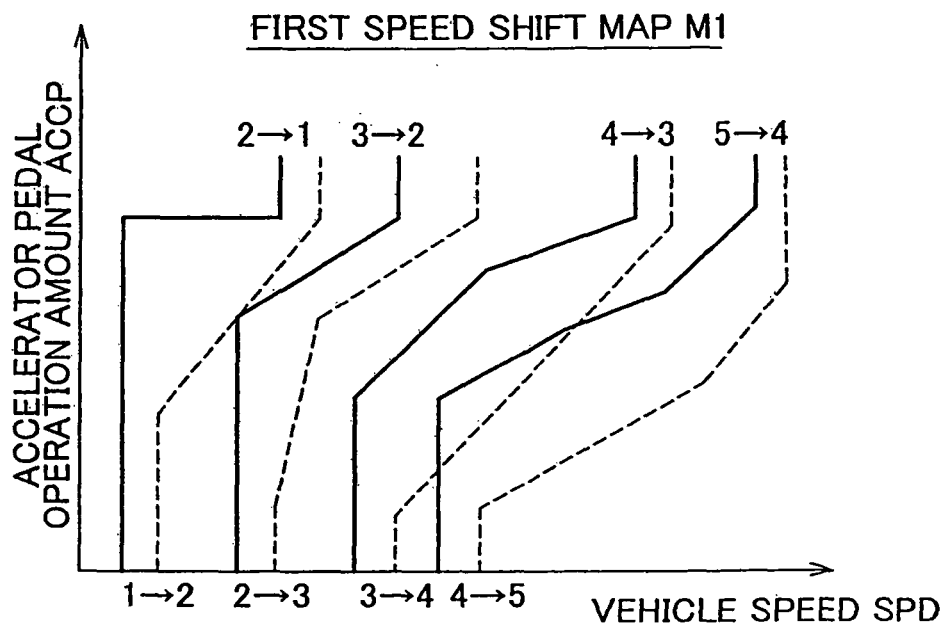
FIG. 2 is a graph showing an example of the settings of gear change lines of a first gear change map based on the vehicle speed and the accelerator pedal operation amount adopted in the embodiment.

FIG. 2 shows an example of the settings of gear change lines in the first gear change map M1. As shown in the drawing, each gear change line in the first gear change map M1 is defined by the vehicle speed SPD and the accelerator pedal operation amount ACCP. The gear change lines for downshifting the automatic transmission 11 are shown by the solid lines, and those for upshifting are shown by the broken lines. The gear change line "m→n" (where m, n are each a number of 1 to 5) in FIGS. 2 and 3 represents the gear change line for a shift from the "m-th gear" to the "n-th gear." Each gear change line for upshifting in the first gear change map M1 is provided with a hysteresis based on the corresponding gear change line for downshifting.

Figure 3:
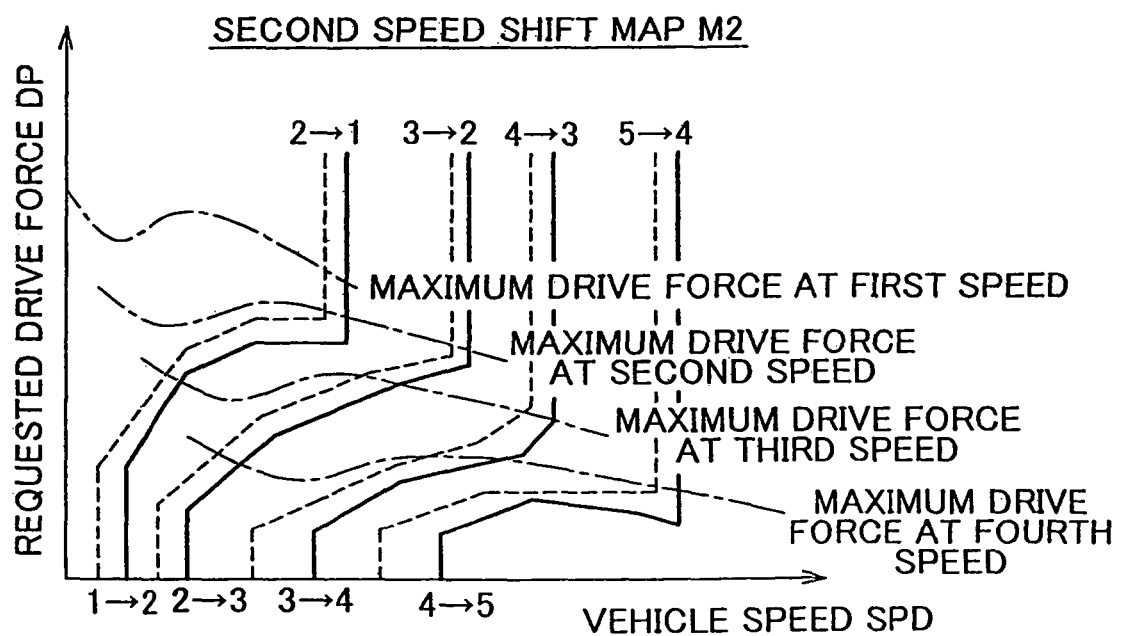
FIG. 3 is a graph showing an example of the settings of gear change lines of a second gear change map based on the vehicle speed and the required drive force of the vehicle adopted in the embodiment.

FIG. 3 shows an example of the settings of gear change lines in the second gear change map M2. As shown in the drawing, each gear change line in the second gear change map M2 is defined by the vehicle speed SPD and the required drive force DP. The gear-shift lines for upshifting the automatic transmission 11 are shown by the solid lines, and those for downshifting are shown by the broken lines. In the drawing, the maximum drive force of the vehicle in each gear is also shown by the dot-and-dash lines. Each gear change line for downshifting in the second gear change map M2 is provided with a hysteresis based on the corresponding gear change line for upshifting.

The required drive force DP of the vehicle refers to the drive force required for the vehicle to maintain its current traveling state. The required drive force DP is calculated sequentially by the electronic control unit 20 based on the vehicle speed SPD and the accelerator pedal operation amount ACCP.

In this embodiment, the electronic control unit 20 basically references the first gear change map M1 to determine whether to downshift the automatic transmission 11, and references the second gear change map M2 to determine whether to upshift. That is, in this embodiment, different gear change maps are used to determine whether to downshift or upshift the automatic transmission.

As described above, the first gear change map M1 is based on the vehicle speed SPD and the accelerator pedal operation amount ACCP. Therefore, determining whether to downshift the automatic transmission 11 is made based on the accelerator pedal operation by referencing the first gear change map M1. The second gear change map M2, in contrast, is based on the vehicle speed SPD and the required drive force DP of the vehicle. It should be noted that the operating state of the internal combustion engine 10 (engine speed, engine load) may be determined from the vehicle speed SPD, the required drive force DP, and the gear of the automatic transmission 11. Therefore, determining whether to upshift the automatic transmission 11, which is made on the basis of the required drive force DP of the vehicle, with the fuel consumption characteristics, the exhaust characteristics, and so forth of the internal combustion engine 10 taken into account by referencing the second gear change map M2.

In general, if the automatic transmission 11 is not downshifted when the accelerator pedal is depressed, acceleration as intended by the driver cannot be obtained. Therefore, the automatic transmission 11 should be downshifted in accordance with the operation of the accelerator pedal to reflect the driver's intentions. However, the automatic transmission 11 is seldom downshifted intentionally by the driver.

In this respect, in this embodiment, the automatic transmission 11 is downshifted in accordance with the operation of the accelerator pedal to reflect the driver's intentions, and upshifted based on the required drive force DP of the vehicle and to satisfying requirements relating to the fuel consumption characteristics, the exhaust characteristics, and so forth of the internal combustion engine 10. Therefore, in this embodiment, it is possible to both reflect the driver's intention and satisfy requirements relating to the internal combustion engine 10, for example requirements relating to fuel consumption characteristics and exhaust characteristics.

When a downshift and an upshift of the automatic transmission 11 are determined based on different parameters as described above, gear hunting may occur in the gear change operation of the automatic transmission 11. That is, the condition for downshifting, which is based on the operation of the accelerator pedal, and the condition for upshifting, which is based on the required drive force DP of the vehicle, are satisfied at the same time on some occasions, so that a downshift is immediately followed by an upshift, or vice versa. When downshifting, gear hunting in the gear change operation may be avoided by taking the required drive force DP of the vehicle into some account, in addition to the accelerator pedal operations. When upshifting, gear hunting in the gear change operation may be avoided by taking the accelerator pedal operations into some account, in addition to the required drive force DP of the vehicle.

Thus, in this embodiment, the first gear change map M1 for downshifting also includes gear change lines for upshifting; in addition, the second gear change map M2 for upshifting also includes gear change lines for downshifting, as discussed above. Then, in order to avoid hunting as described above, the gear change determination is made as follows.

In this embodiment, if the preceding and subsequent shifts are consecutive downshifts, the first gear change map M1, which is based on the vehicle speed SPD and the accelerator pedal operation amount ACCP, is referenced as discussed above to determine whether the subsequent downshift is permitted. On the other hand, if the preceding shift is an upshift, both the first gear change map M1 and the second gear change map M2 are referenced to determine whether a subsequent downshift should be executed. That is, in this case, the subsequent downshift is permitted when the condition for downshifting defined by the second gear change map M2 is fulfilled, in addition to the condition for downshifting defined by the first gear change map M1.

As discussed above, each gear change line for downshifting in the second gear change map M2 is provided with a hysteresis based on the corresponding gear change line for upshifting. Therefore, even if the condition for downshifting based on the first gear change map M1 is satisfied immediately after the automatic transmission has upshifted based on the second gear change map M2, the condition for downshifting based on the second speed gear change map M2 is not satisfied so that gear hunting may be avoided.

In addition, in this embodiment, if the preceding and subsequent shifts are consecutive upshifts, the second gear change map M2, which is based on the vehicle speed SPD and the required drive force DP, is referenced as discussed above to determine whether the subsequent upshift is permitted. However, if the preceding shift is a downshift, both the first gear change map M1 and the second gear change map M2 are referenced to determine whether the subsequent upshift is permitted. That is, in this case, the subsequent upshift is permitted when the condition for an upshift defined by the first gear change map M1 is fulfilled, in addition to the condition for an upshift defined by the second gear change map M2.

As discussed above, each gear change line for an upshift in the first gear change map M1 is provided with a hysteresis based on the corresponding gear change line for a downshift. Therefore, even if the upshift condition based on the second gear change map M2 is satisfied immediately after the automatic transmission has downshifted based on the first gear change map M1, the downshift condition based on the first gear change map M1 is not satisfied immediately so that gear hunting is avoided.

In this embodiment, the determination as to the first gear change in the current trip is made on the assumption that the preceding shift is an upshift. This is because the first shift in any trip is generally an upshift from first gear to second gear, for which there is no need to consider gear hunting in the gear change operation.

Figure 4:
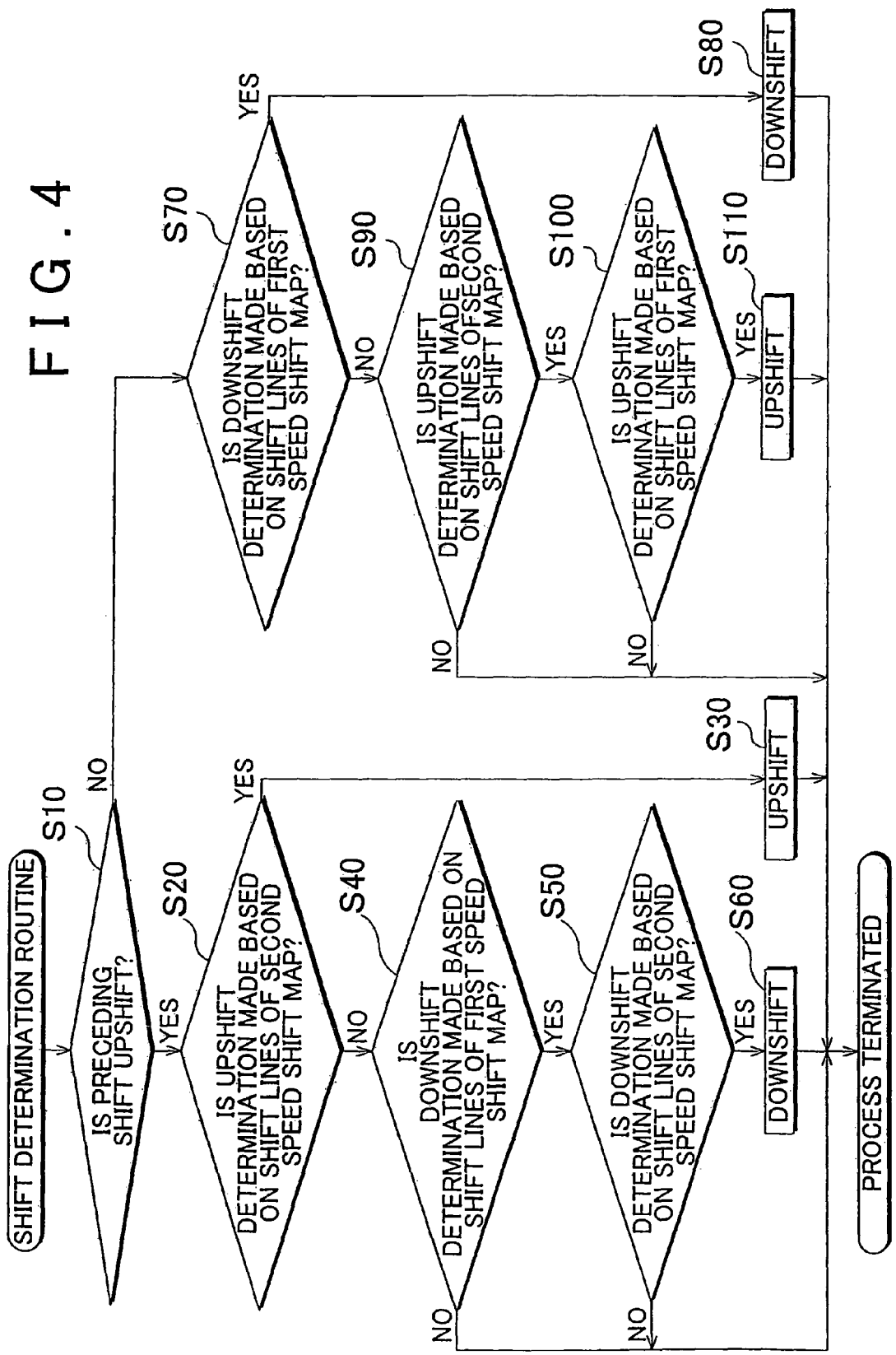
FIG. 4 is a flowchart showing the process procedure of a gear change determination routine adopted in the embodiment.
Figure 5:
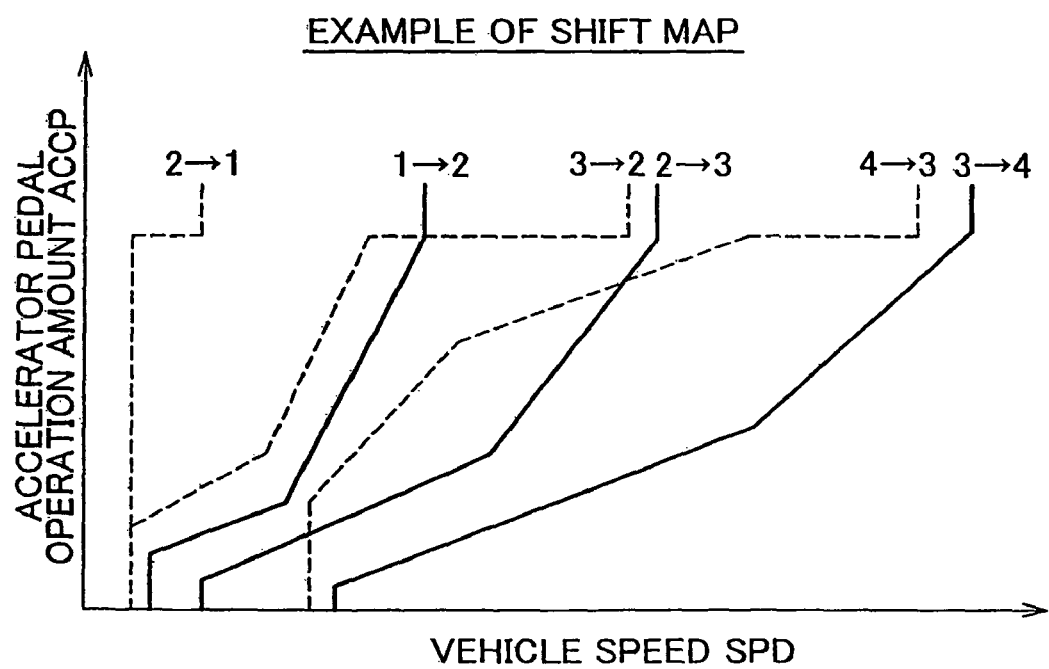
FIG. 5 is a graph showing an example of a gear change map adopted in a gear change device in accordance with a related art.

FIG. 4 is a flowchart of a gear change determination routine for determining whether the automatic transmission should change gear in this embodiment. The routine is executed periodically by the electronic control unit 20 during operation of the vehicle.

When the routine is started, the electronic control unit 20 first checks in step S10 whether the preceding shift is an upshift or a downshift. If the preceding shift is an upshift (S10: YES), the electronic control unit 20 confirms in step S20 whether the automatic transmission should upshift subsequently based on the gear change lines of the second gear change map M2, which is defined by the vehicle speed SPD and the required drive force DP. If it is determined that the automatic transmission should upshift based on the gear change lines of the second gear change map M2 (S20: YES), that is, if successive upshifts are to be executed following the preceding downshift, the electronic control unit 20 commands the automatic transmission 11 to upshift in step S30 and terminates the routine.

On the other hand, if it has not been determined that the transmission should upshift based on the gear change lines of the second gear change map M2 (S20: NO), the electronic control unit 20 confirms in step S40 whether the automatic transmission should downshift based on the gear change lines of the first gear change map M1. If it has not been determined that the transmission should downshift based on the gear change lines of the first gear change map M1 (S40: NO), the electronic control unit 20 terminates the routine without commanding a change of gear.

If it is determined that the automatic transmission should downshift based on the gear change lines of the first gear change map M1 (S40: YES), the electronic control unit 20 confirms in step S50 whether it is determined that the automatic transmission should downshift based on the gear change lines of the second gear change map M2. Then, if it is determined that the automatic transmission should downshift based on the gear change lines of the second gear change map M2 (S50: YES), the electronic control unit 20 commands the automatic transmission 11 to downshift in step S60. If not (S50: NO), the electronic control unit 20 does not issue a command to change gear. The electronic control unit 20 then terminates the routine. That is, if the preceding shift is an upshift, the subsequent downshift is not executed unless it is determined that the automatic transmission 11 should downshift based on the gear change lines of both the first gear change map M1 and the second gear change map M2.

On the other hand, if the preceding gear change is a downshift (S10: NO), the electronic control unit 20 checks in step S70 whether it is determined that the automatic transmission 11 should downshift based on the gear change lines of the first gear change map M1. If it is determined that the automatic transmission 11 should downshift based on the gear change lines of the first gear change map M1 (S70: YES), that is, in the case where successive downshifts are to be performed following the preceding downshift, the electronic control unit 20 commands the automatic transmission 11 to downshift in step S80 and terminates the routine.

In contrast, if it is determined that the automatic transmission should not downshift based on the gear change lines of the first gear change map M1 (S70: NO), the electronic control unit 20 confirms in step S90 whether it is determined that the automatic transmission should upshift based on the gear change lines of the second gear change map M2. If it is determined that the automatic transmission should not upshift based on the gear change lines of the second gear change map M2 (S90: NO), the electronic control unit 20 terminates the routine without issuing a gear change command.

If it is determined that the automatic transmission should upshift based on the gear change lines of the second gear change map M2 (S90: YES), the electronic control unit 20 confirms in step S100 whether it is determined that the automatic transmission should upshift based on the gear change lines of the first gear shift map M1. Then, if it is determined that the transmission should upshift based on the gear change lines of the first gear change map M1 (S100: YES), the electronic control unit 20 commands the automatic transmission 11 to upshift in step S110. If not (S100: NO), the electronic control unit 20 does not issue a gear change command. The electronic control unit 20 then terminates the routine. That is, if the preceding shift is a downshift, the automatic transmission 11 delays the upshift in the current shift unless it is determined that the automatic transmission should upshift based on the gear change lines of both the first gear change map M1 and the second gear change map M2.

In this embodiment, the first gear change map M1 corresponds to the first gear change determination section describe above that determines whether the transmission should change gear based on the vehicle speed and the accelerator pedal operation amount or the throttle opening degree. Also, in this embodiment, the second gear change map M2 corresponds to the second gear change determination section described above that determines whether the transmission should change gear based on the vehicle speed and the load on the internal combustion engine or the required drive force of the vehicle.

According to the shift control device for an automatic transmission in accordance with the above embodiment, the following effects are obtained.

In this embodiment, the first gear change map M1 is based on the vehicle speed SPD and the accelerator pedal operation amount ACCP and the second gear change map M2 is based on the vehicle speed SPD and the required drive force DP of the vehicle. The first gear change map M1 is referenced to determine whether the automatic transmission 11 should downshift, and the second gear change map M2 is referenced to determine whether the automatic transmission 11 should upshift. Therefore, in this embodiment, the automatic transmission 11 is downshifted in accordance with the operation of the accelerator pedal to reflect the driver's intentions, and upshifted based on the required drive force DP of the vehicle and so as to satisfy requirements relating to fuel consumption characteristics, exhaust characteristics, and so forth. Thus, it is possible to both reflect the driver's intention and satisfy requirements relating to the internal combustion engine, for example requirements relating to fuel consumption characteristics and exhaust characteristics.

In this embodiment, the first gear change map M1 for downshifting also includes gear change lines for upshifting. Likewise, the second gear change map M2 for upshifting also includes gear change lines for downshifting. If the preceding shift is a downshift, the determination as to whether the automatic transmission should downshift is made based on the gear change lines of the first gear change map M1. If the preceding shift is an upshift, the determination as to whether the subsequent upshift is permitted is made based on the gear change lines of the second gear change map M2, in addition to the gear change lines of the first gear change map M1. On the other hand, if the preceding shift is an upshift, the determination as to whether the automatic transmission should upshift is made based on the gear change lines of the second gear change map M2. If the preceding shift is a downshift, the determination as to whether the automatic transmission should upshift is made based on the gear change lines of the first gear change map M1, in addition to the gear change lines of the second gear change map M2. Therefore, it is possible to avoid gear hunting, which tends to occur if the automatic transmission is upshifted and downshifted based on separate parameters, when changing gears.

It should be noted that the above embodiment may be modified as described below.

In the above embodiment, the second gear change map M2 is defined by the vehicle speed SPD and the required drive force DP of the vehicle. However, the second gear change map M2 may alternatively be defined by the vehicle speed SPD and the load on the internal combustion engine 10. In this case, the determination to upshift the automatic transmission 11 may be made based on the gear change lines of the second gear change map M2, so that the automatic transmission 11 is upshifted with the satisfaction of requirements relating the internal combustion engine, for example requirements relating fuel consumption characteristics and exhaust characteristics. Examples of the indicator of the load on the internal combustion engine 10 include the intake air amount and the throttle opening degree for gasoline engines, of which output is adjusted using the intake air amount, and the fuel injection amount for diesel engines, of which output is adjusted using the fuel injection amount.

In the above embodiment, the first gear change map M1 is defined based on the vehicle speed SPD and the accelerator pedal operation amount ACCP. In some internal combustion engines, of which output is adjusted using the intake air amount, the throttle opening degree is varied in association with accelerator pedal operations so that the accelerator pedal operation amount is substantially unique to the throttle opening degree. If the present invention is applied to an automatic transmission that is connected to such internal combustion engines, the gear change lines of the first gear change map M1 may be defined by the vehicle speed SPD and the throttle opening degree. Also in this case, the determination to downshift the automatic transmission 11 may be made based on the gear change lines of the first gear change map M1, which is defined by the vehicle speed SPD and the throttle opening degree, so that the automatic transmission 11 downshifts in accordance with the driver's intentions.

In the above embodiment, the first gear change map M1 for a downshift is provided with gear change lines for an upshift as well, and the second gear change map M2 for an upshift is provided with gear change lines for a downshift as well. The gear change lines for an upshift of the first gear change map M1 and the gear change lines for downshifting of the second gear change map M2 are respectively used in an auxiliary determination as to whether the automatic transmission should upshift or downshift, thereby avoiding gear hunting when the automatic transmission changes gears. However, if there is no need to avoid such gear hunting, the gear change lines for upshifting may be omitted in the first gear change map M1, and the gear change lines for downshifting may be omitted in the second gear change map M2. In such a case, the determination to downshift the automatic transmission 11 is made only with reference to the first gear change map M1, and upshift determinations are made only with reference to the second gear change map M2.

The settings of the gear change lines of the first gear change map M1 and the second gear change map M2 are not limited to those illustrated in FIGS. 2 and 3, and may be modified appropriately according to the vehicle to which the present invention is applied.

In the above embodiment, the present invention is applied to an automatic transmission provided with five forward gears. However, the present invention may be applied to any automatic transmission regardless of the number of gears.

The invention claimed is:

1. A shift control device that determines whether an automatic transmission should change gear, comprising:
   a first gear change determination section that determines whether the automatic transmission should change gear based on a vehicle speed and an accelerator pedal operation amount or based on the vehicle speed and a throttle opening degree; and
   a second gear change determination section that determines whether the automatic transmission should change gear based on the vehicle speed and a load on an internal combustion engine or based on the vehicle speed and a required drive force of the vehicle, wherein:
   the first gear change determination section is used to determine whether the automatic transmission should downshift; and
   the second gear change determination section that is used to determine whether the automatic transmission should upshift.

2. The shift control device according to claim 1, wherein:
   the first gear change determination section makes auxiliary determination for upshifting the automatic transmission; and
   the second gear change determination section makes auxiliary determination for downshifting the automatic transmission.

3. The shift control device according to claim 2,
   if a preceding shift is a downshift, the first gear change determination section is used to determine whether a subsequent downshift is permitted; and
   if the preceding shift is an upshift, the first and second gear change determination sections are both used to determine whether a subsequent downshift is permitted.

4. The shift control device according to claim 3, wherein a first determination whether the automatic transmission should change gear in a current trip is made on an assumption that the preceding shift is an upshift.

5. The shift control device according to claim 2, wherein:
if a preceding shift is an upshift, the second gear change determination section is used to determine whether a subsequent upshift is permitted; and
if the preceding shift is a downshift, the first and second gear change determination sections are both used to determine whether a subsequent upshift is permitted.

6. The shift control device according to claim 5, wherein a determination whether the automatic transmission should change gear in a current trip is made on an assumption that the preceding shift is an upshift.

7. A shift control method for determining whether an automatic transmission mounted on a vehicle should change gear, comprising:
determining whether the automatic transmission should downshift based on a vehicle speed and an accelerator pedal operation amount or based on the vehicle speed and a throttle opening degree; and
determining whether the automatic transmission should upshift based on the vehicle speed and a load on an internal combustion engine or based on the vehicle speed and a required drive force of the vehicle.

8. The method of claim 7, wherein determining whether the automatic transmission should downshift is based on direct driver input and wherein determining whether the automatic transmission should upshift is based on predetermined characteristics of the vehicle.

9. A shift control device that determines whether an automatic transmission should change gear, comprising:
a first gear change determination section that determines whether the automatic transmission should change gear based on a vehicle speed and an accelerator pedal operation amount or based on the vehicle speed and a throttle opening degree, the downshift of the automatic transmission being determined based on direct driver input; and
a second gear change determination section that determines whether the automatic transmission should change gear based on the vehicle speed and a load on an internal combustion engine or based on the vehicle speed and a required drive force of the vehicle, the upshift of the automatic transmission being determined based on predetermined characteristics of the vehicle.

* * * * *